UNITED STATES PATENT OFFICE.

WILLIAM H. GOLDER, OF DETROIT, MICHIGAN.

COATING COMPOSITION.

No. 887,248.

Specification of Letters Patent.

Patented May 12, 1908.

Application filed June 3, 1907. Serial No. 376,931.

*To all whom it may concern:*

Be it known that I, WILLIAM H. GOLDER, a citizen of the United States, residing at Detroit, in the county of Wayne and State of Michigan, have invented certain new and useful Improvements in a Coating Composition; and I do declare the following to be a full, clear, and exact description of the invention, such as will enable others skilled in the art to which it appertains to make and use the same.

This invention has relation to new and useful improvements in coating compositions and has for its object to provide an absolutely fire and water proof coating or composition for coating roofs, wainscoting, floors or the like that may be caused to adhere to any surface whether it be stone, brick, cement, wood or glass and never flake off.

In compounding the coating composition, I mix one barrel of sand *i. e.*, 240 pounds, one peck of marble dust, one pound of crushed glass and six pounds of litharge forming a mixture in the nature of a plastic of about the consistency of wet sand, which is applied to a surface by a plastering trowel, or other suitable device. In applying this mixture to a surface, I moisten each pailful containing, say 10 quarts with a quantity of raw linseed oil mixed with one-eighth pound of red lead.

In using the coating composition, the surface to which it is to be applied is first supplied or coated with a coating of raw linseed oil and the coating composition when applied becomes as hard as stone and makes the surface to which it is applied absolutely water-proof.

To use the composition for roofing, veneering or wood building, sheet steel is first nailed over the boards and coated with raw linseed oil and the composition then applied.

This coating compound may be applied to any surface by first coating it with raw linseed oil and will adhere or stick thereto almost indefinitely.

I claim as my invention:—

1. A coating compound comprising sand, marble dust, crushed glass, litharge, raw linseed oil and red lead.

2. A coating compound comprising one quart of raw linseed oil and one-eighth pound of red lead mixed with a pailful containing, say 10 quarts of sand, marble dust, crushed glass and litharge in the following proportions: sand, one barrel *i. e.*, 240 pounds; marble dust, one peck; crushed glass, one pound and litharge six pounds.

In testimony whereof I have hereunto set my hand in presence of two subscribing witnesses.

WILLIAM H. GOLDER.

Witnesses:
O. L. HANNAN,
A. H. GOLDER.